United States Patent
Patel et al.

(10) Patent No.: US 9,320,924 B2
(45) Date of Patent: Apr. 26, 2016

(54) SELF-LOCKING WEBBING CONNECTABLE DEVICE ATTACHMENT PLATE

(71) Applicant: Honeywell International Inc., Morristown, NJ (US)

(72) Inventors: Parul Patel, Franklin, PA (US); Justin Patton, Franklin, PA (US); Ross Balquist, Slippery Rock, PA (US); Brian Montgomery, Mercer, PA (US)

(73) Assignee: Honeywell International Inc., Morris Plains, NJ (US)

( * ) Notice: Subject to any disclaimer, the term of this patent is extended or adjusted under 35 U.S.C. 154(b) by 359 days.

(21) Appl. No.: 13/838,765

(22) Filed: Mar. 15, 2013

(65) Prior Publication Data

US 2014/0262608 A1    Sep. 18, 2014

(51) Int. Cl.
*F16B 45/06*    (2006.01)
*A62B 35/00*    (2006.01)
*F16B 45/02*    (2006.01)

(52) U.S. Cl.
CPC ............. *A62B 35/0037* (2013.01); *F16B 45/02* (2013.01); *F16B 45/06* (2013.01); *Y10T 24/45236* (2015.01)

(58) Field of Classification Search
CPC ........... A62B 35/0025; A62B 35/0031; A62B 35/0037; A62B 35/0075; F16B 45/04; F16B 45/06
USPC ...... 182/3; 24/173, 182, 193, 265 BC, 590.1, 24/599.3, 599.9
See application file for complete search history.

(56) References Cited

U.S. PATENT DOCUMENTS

| | | | | |
|---|---|---|---|---|
| 331,160 | A | * | 11/1885 | Riley ............................ 24/598.5 |
| 380,990 | A | * | 4/1888 | Carter & Louther ........ 24/598.5 |
| 1,241,806 | A | * | 10/1917 | Anderson ..................... 24/598.5 |
| 1,252,184 | A | * | 1/1918 | SChreyer .......................... 59/88 |
| 1,449,978 | A | * | 3/1923 | Fordyce ........................ 24/580.1 |
| 1,455,330 | A | * | 5/1923 | Fordyce ........................ 24/598.5 |
| 2,211,273 | A | * | 8/1940 | Kleckner ...................... 24/598.5 |
| 3,421,187 | A | * | 1/1969 | Ryder ............................ 403/391 |
| 3,568,264 | A | * | 3/1971 | Crist ............................. 294/87.1 |
| 4,089,087 | A | * | 5/1978 | Heitman ..................... 285/124.2 |
| 4,464,813 | A | | 8/1984 | Bakker et al. |
| 4,846,075 | A | | 7/1989 | Tupper |
| 4,977,647 | A | | 12/1990 | Casebolt |
| 5,056,954 | A | | 10/1991 | Flux et al. |
| 5,224,247 | A | | 7/1993 | Collier |
| 5,860,198 | A | | 1/1999 | Buntin, Jr. |

(Continued)

*Primary Examiner* — Colleen M Chavchavadze
(74) *Attorney, Agent, or Firm* — Craige Thompson; Thompson Patent Law

(57) ABSTRACT

Apparatus and associated methods relate to a safety interface device that securely attaches to a length of webbing, while simultaneously providing a plurality of non-intersecting apertures to couple to a corresponding plurality of safety devices. In some embodiments, the safety interface device may be retrofitted to a closed webbing on a pre-fabricated safety harness. In some exemplary embodiments, the element may be opened and closed by providing two pivotably coupled plates, permitting the webbing to be installed when the plates are opened, and secured when the plates are closed. Various embodiments, for example, provide a securing pin which automatically locks the device to the webbing when the device is closed around the webbing. In some embodiments, the device will be again locked in a secondary fashion whenever a safety device is attached to the interface plate. Thus, at least two distinct actions may be required to open the device.

16 Claims, 15 Drawing Sheets

(56) References Cited

U.S. PATENT DOCUMENTS

| | | |
|---|---|---|
| 6,520,290 B1 | 2/2003 | Carter |
| 6,698,544 B2 | 3/2004 | Kurtgis |
| 6,793,046 B2 | 9/2004 | Petzl et al. |
| 6,837,337 B2 | 1/2005 | Thomas et al. |
| 6,883,640 B2 | 4/2005 | Kurtgis |
| 6,990,928 B2 | 1/2006 | Kurtgis |
| 7,108,099 B2 | 9/2006 | Ador |
| 7,114,225 B2 | 10/2006 | Casebolt et al. |
| 7,137,481 B2 | 11/2006 | Petzl et al. |
| 7,395,984 B2 | 7/2008 | Szarkowski et al. |
| 8,191,212 B2 | 6/2012 | Woods |
| 8,220,118 B2 | 7/2012 | Buckingham et al. |
| 8,226,138 B2 | 7/2012 | Rocourt et al. |
| 8,276,612 B2 | 10/2012 | Folk |
| 2010/0293758 A1* | 11/2010 | Shiao .............................. 24/182 |

* cited by examiner

SELF-LOCKING WEBBING CONNECTABLE DEVICE ATTACHMENT PLATE

TECHNICAL FIELD

Various embodiments relate generally to fall-protection systems.

BACKGROUND

Many industrial tasks require workers to assume some risk of danger. For example, working at great heights is sometimes required when constructing tall buildings. Working on bridge maintenance also may require some individuals to assume some risk of injury. Some jobs require workers to be suspended from a helicopter or from some structure as they perform their tasks and duties. Also, many people enjoy recreational activities in which danger may be present. Examples of such recreational activities may include spelunking, rock climbing, and mountain climbing.

Both workers, who must work at such great heights, and the employers who employ them have an interest in protecting the lives and bodies of these employees. Injury results not only in high medical costs, but also costs in reputation and quality of life. People who recreate in dangerous manners also desire protection, should they take a misstep or should some debris fall upon them, causing them to lose their footing.

Fall-protection devices permit people to minimize the risk of injury when they engage is dangerous work or recreational activities. These fall-protection devices may therefore minimize the cost a business must assume when undertaking these types of business activities. And individuals who enjoy the thrill of partaking in recreational activities that have some risk of injury due to fall can do so while minimizing such risks by using these fall-protection safety devices.

SUMMARY

Apparatus and associated methods relate to a safety interface device that securely attaches to a length of webbing, while simultaneously providing a plurality of non-intersecting apertures to couple to a corresponding plurality of safety devices. In some embodiments, the safety interface device may be retrofitted to a closed webbing on a pre-fabricated safety harness. In some exemplary embodiments, the element may be opened and closed by providing two pivotably coupled plates, permitting the webbing to be installed when the plates are opened, and secured when the plates are closed. Various embodiments, for example, provide a securing pin which automatically locks the device to the webbing when the device is closed around the webbing. In some embodiments, the device will be again locked in a secondary fashion whenever a safety device is attached to the interface plate. Thus, at least two distinct actions may be required to open the device.

Various embodiments may achieve one or more advantages. For example, some embodiments may provide a plurality of device apertures, thereby permitting both safety device attachment and additional free apertures should a safety hook be needed due to fall. In some examples, the safety interface plate element may be shaped to substantially conform to a portion of an operator's body, such as the mid or upper back region, to improve comfort and potentially reduce injury during fall impact events, for example. Some embodiments may provide an additional locking mechanism securing the mating surfaces of the arms, which may provide additional protection from accidental webbing detachment. Some exemplary embodiments provide for increased strength perpendicular to the axis of closure.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
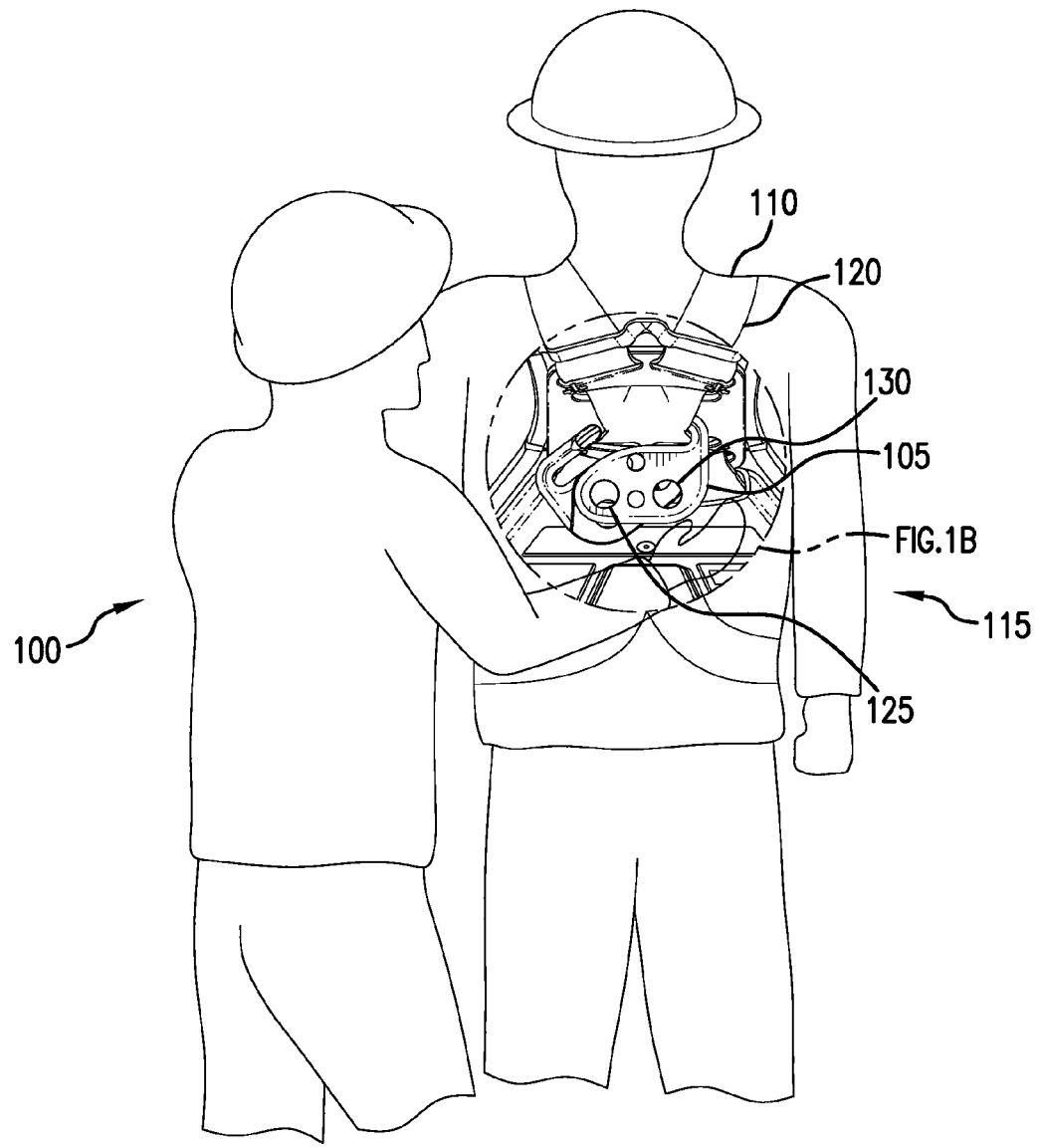
FIGS. 1a-1b depict an exemplary use of a self-locking webbing connectable Device Attachment Plate (DAP) being attached in the field to a webbing.
Figure 1B:
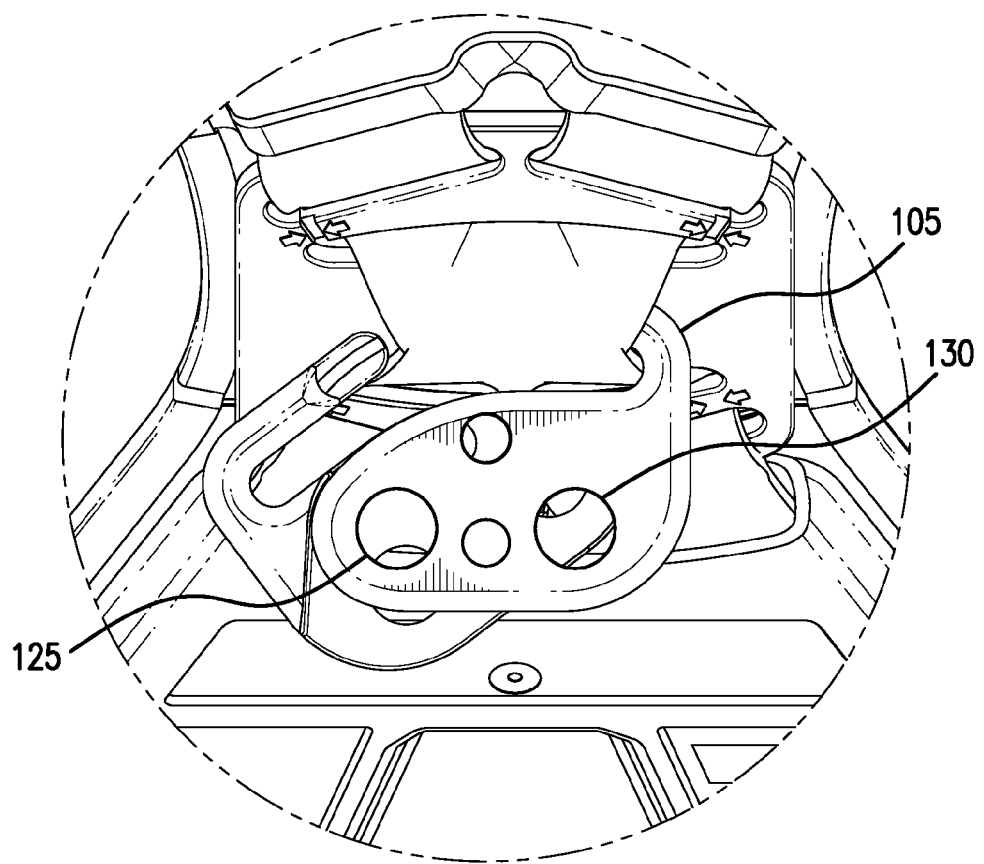

FIGS. 1a-1b depict an exemplary use of a self-locking webbing connectable Device Attachment Plate (DAP) being attached in the field to a webbing. In FIGS. 1a-1b, a construction worker 100 is shown to be attaching an exemplary DAP 105 to a safety harness 110 of a second construction worker 115. The safety harness 110 has a webbing 120 that is being inserted into the DAP 105, which is shown in an open position. This open position of this exemplary DAP 105 is shown to permit the insertion of the webbing 120. After the DAP is attached to the safety harness of the construction worker 115, various devices can be attached to the two depicted device apertures 125, 130 of this exemplary DAP 105.

Figure 2A:
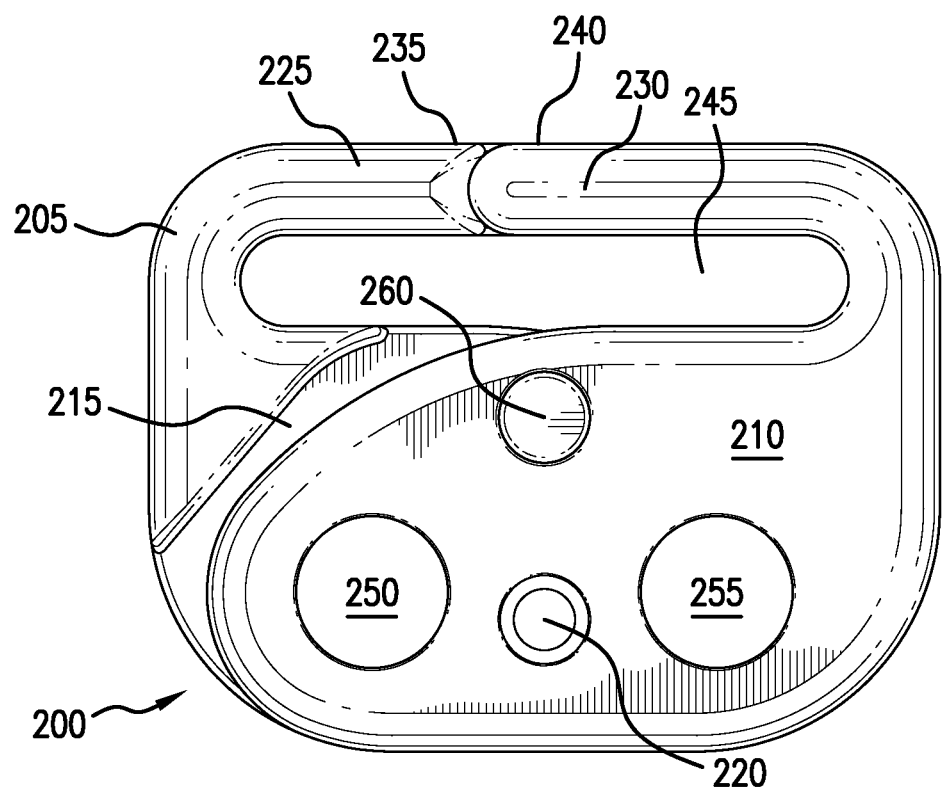
FIGS. 2a-2d depict an exemplary DAP in open and closed positions.
Figure 2B:
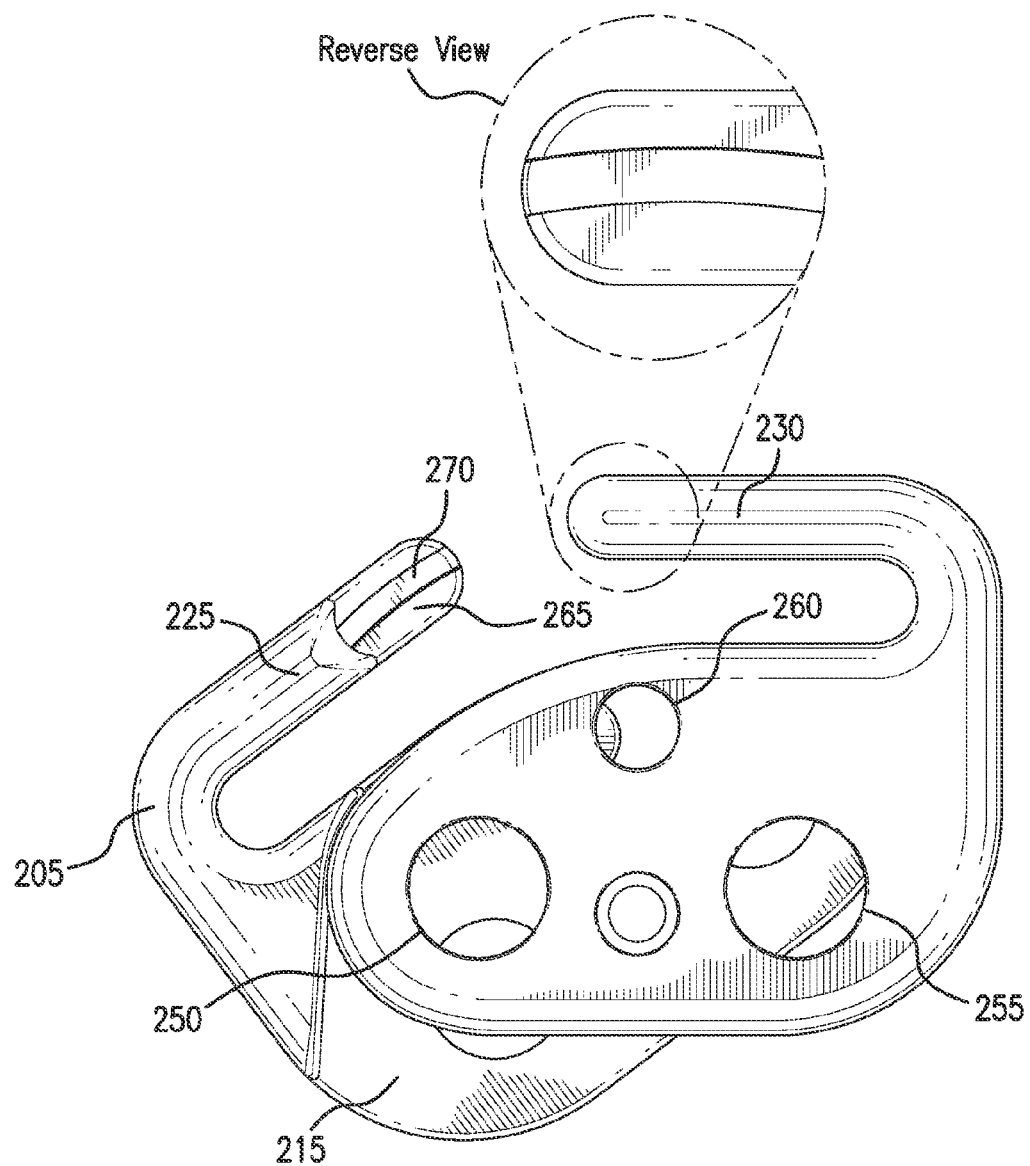
Figure 2C:
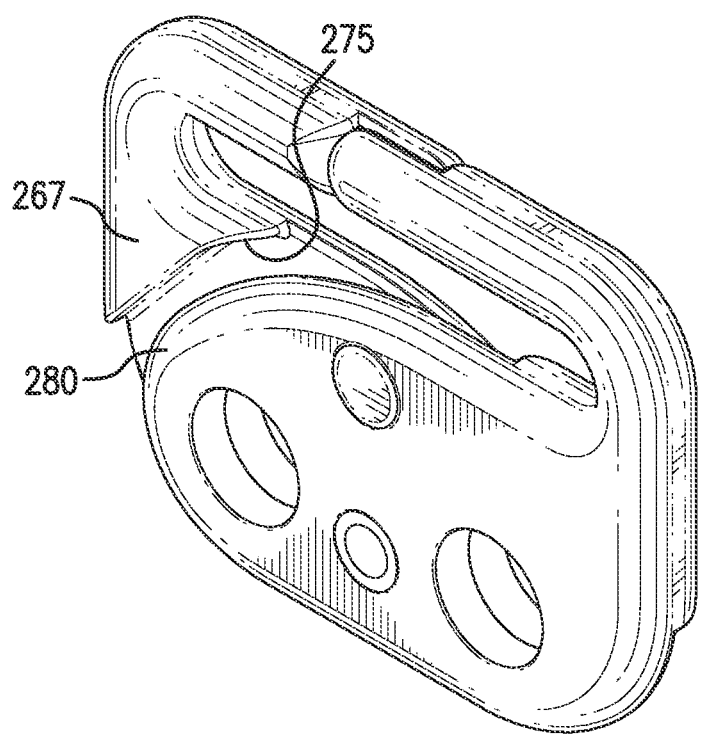
Figure 2D:
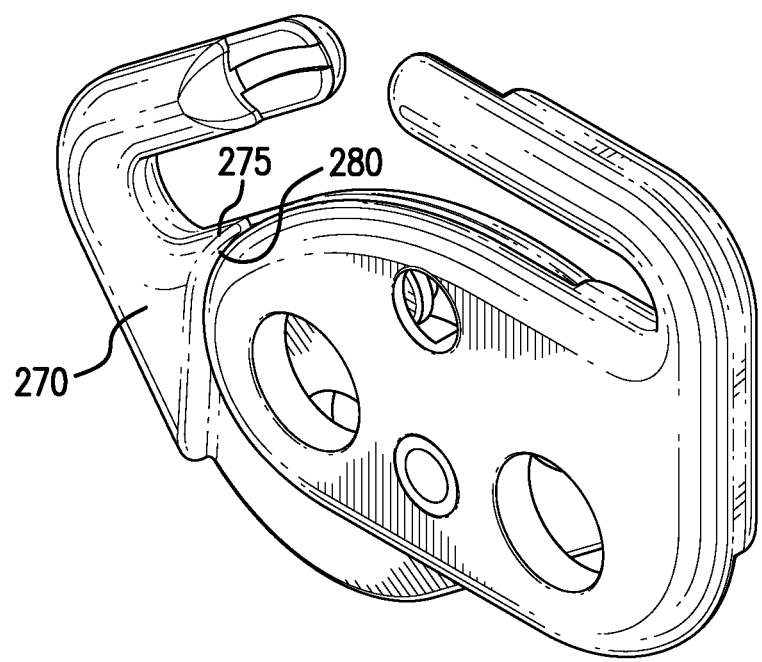

FIGS. 2a-2f depict an exemplary DAP in an open position (FIGS. 2a, 2c, and 2e) and a closed position (FIGS. 2b, 2d, and 2f). In FIG. 2a, an exemplary DAP is shown in a plan view perspective. FIG. 2a shows this exemplary DAP 200 in a closed position. As depicted, the DAP includes a first and a second pivotably-coupled complementary plates 205, 210. A slidable surface 215 of the first complementary plate 205 is visible in this perspective view. A complementary slidable surface of the second complementary plate 210 faces and slides against the slidable surface 215 of the first complementary plate 205. The first and the second commentary plates 205, 210 pivot about a pivot point 220. The first complementary plate 205 is shown to have an exemplary arm 225 that is attached to the first plate 205. The second complementary plate 210 is shown to also have an exemplary arm 230. In this exemplary closed position, the two arms 225, 230 are touching each other at their distal ends 235, 240. A webbing aperture 245 is shown in this exemplary closed position. Two device apertures 250, 255 are shown in this figure as well. The two device apertures 250, 255 are created by the registration of two corresponding device apertures in each of the two plates. If a solid device is inserted into one of the device apertures in this closed position, the solid device may prohibit the pivoting of the two plates. A securing pin 260 is shown in this exemplary figure. The securing pin 260 locks the two complementary plates 205, 210 in this closed position. To open the position, one must depress this securing pin 260, which is held in the locked position by a spring which can not be seen in this figure.

FIG. 2b is a plan view perspective of the same exemplary DAP shown in FIG. 2a, but in an open position. In this open position depiction, a mating surface 265 of the distal end 235 of an arm is shown. This mating surface 265 of the arm's distal end 235 touches a complementary mating surface of the complementary plate's distal arm 240. Also depicted in this exemplary figure is a raised slidable track 270 on the distal arm's mating surface 265. A complementary groove will also exist on the mating surface of the complementary plate's mating surface, which is depicted in a partial, reverse view of arm 230 in this figure. In this depicted open position, the two device apertures 250, 255 are no longer in registration. The near plate's first device aperture is shown to only have a modest open intersection with the far plate's first device aperture. The second device apertures in this figure have a similar modest open intersection. In this exemplary figure, a small portion of the surface of the depressed security pin 260 is visible.

FIG. 2c is an oblique angle view of the exemplary DAP shown in FIG. 2a in the closed position. In FIG. 2c, a raised positive feature 267 relative to the slidable surface 215 is shown. This raised portion 267 provides a contact point 275 which contacts a spot or location 280 of the second plate when in the full open position. FIG. 2d similarly shows oblique angle views of the exemplary DAP depicted in FIG. 2b in the open position.

Figure 3A:
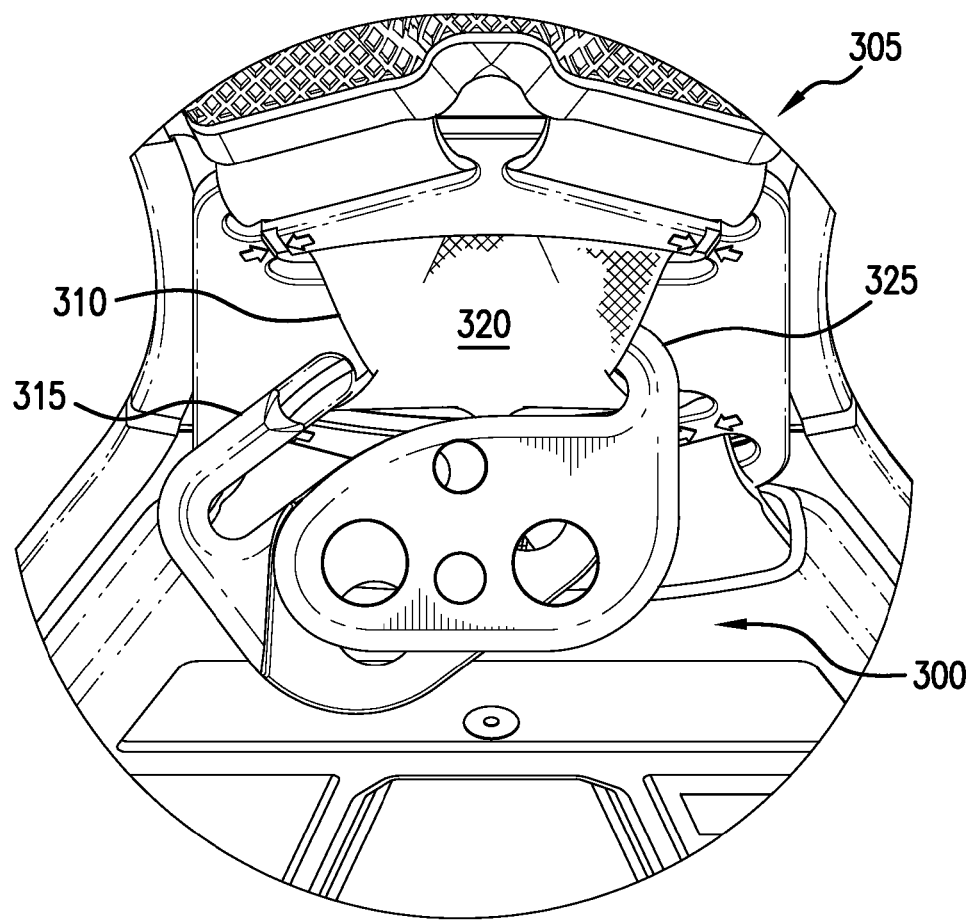
FIGS. 3a-3c depict and exemplary DAP in being attached to a webbing and to devices.
Figure 3B:
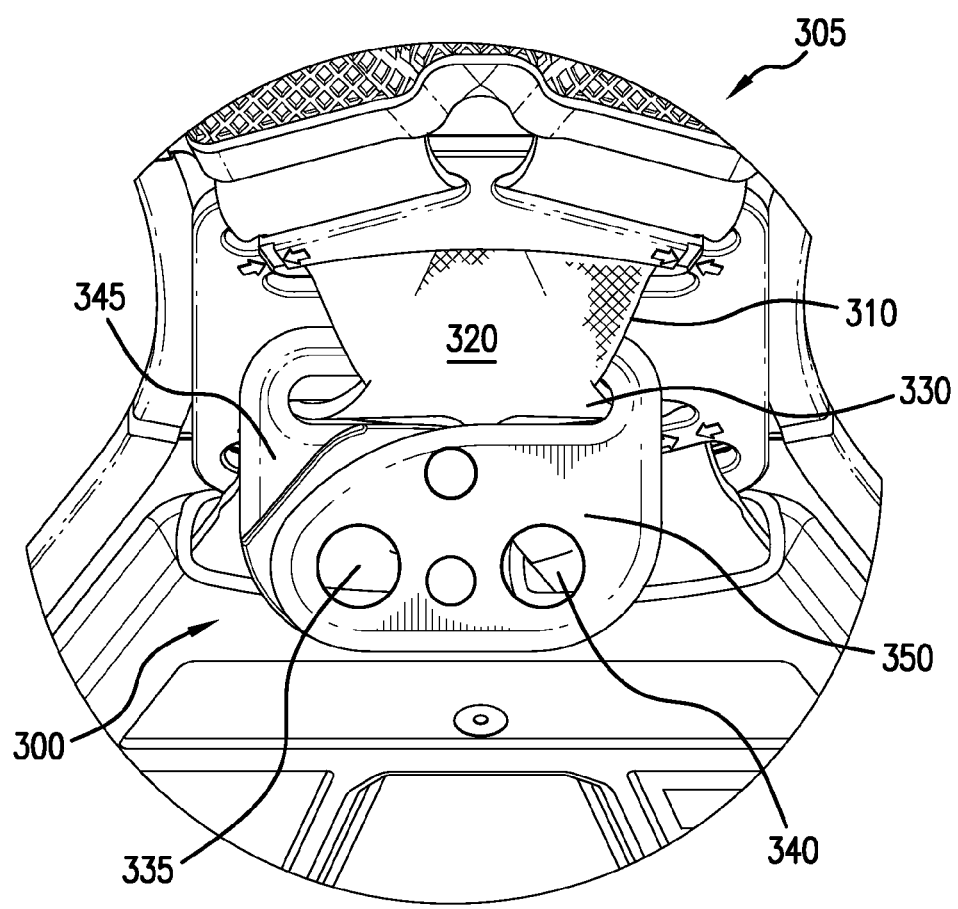
Figure 3C:
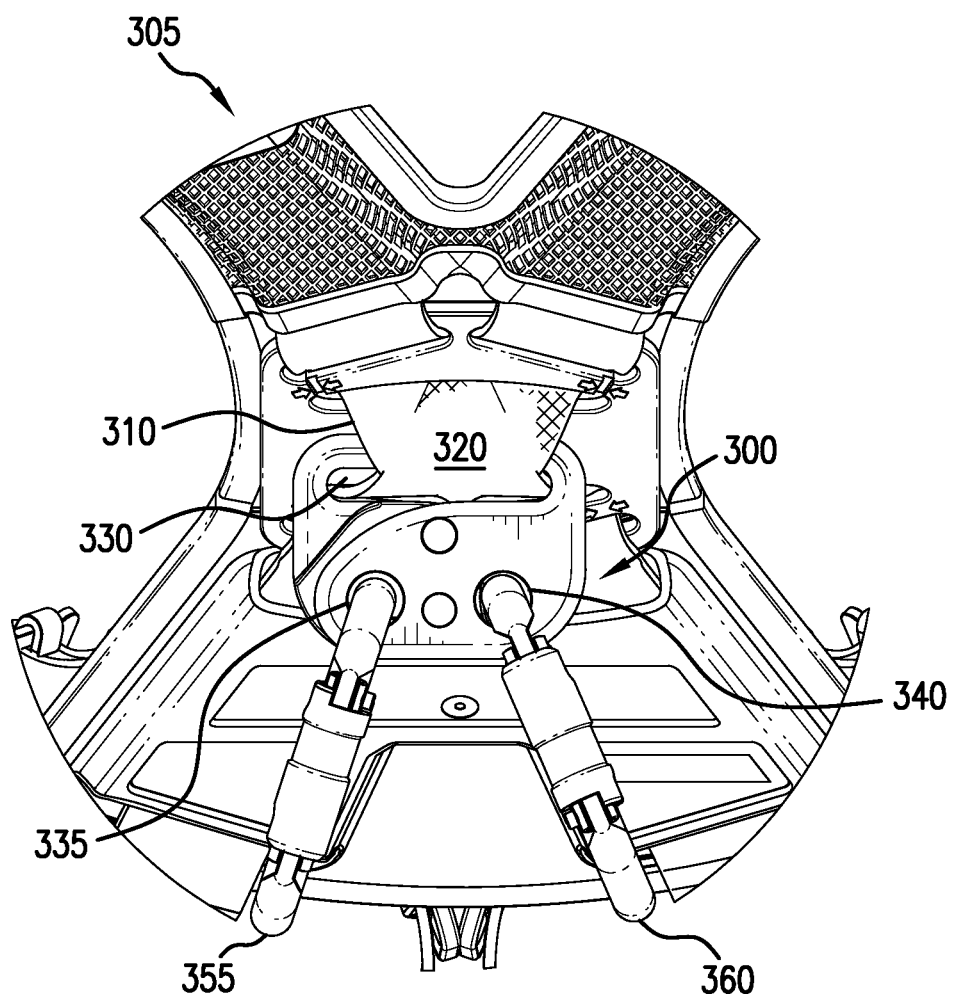

FIGS. 3a-3c depict and exemplary DAP in being attached to a webbing and to devices. FIG. 3a shows an exemplary DAP 300 in an open position and a safety harness 305 with a webbing 310. One arm 315 of the DAP is being inserted behind the webbing 310 at the webbing's cross-over point 320. FIG. 3b show the exemplary DAP after having been closed so that the second arm 325 of the DAP is likewise behind the cross-over point 320 of the webbing 310. The webbing 310 of this exemplary safety harness 305 is shown to be contained within the webbing aperture 330 of the exemplary DAP 300 in FIG. 3b. The device apertures 335, 340 of the two plates 345 350 of the DAP 300 are not in registration with each other in the open position depicted in FIG. 3a. But in FIG. 3b, the device apertures 330, 335 of the two plates 340, 345 are in registration so that the intersection of each plate's device apertures are approximately in registration with the device apertures of the other plate. This allows for devices to be inserted into the DAP 300 and attached to the DAP. FIG. 3c shows two caribiners 355, 360 attached to the DAP. Each caribiner is inserted into one of the device apertures 335, 340 of the DAP 300. Each caribiner can then be connected to a safety attachment such as a lanyard or pulley.

Figure 4A:
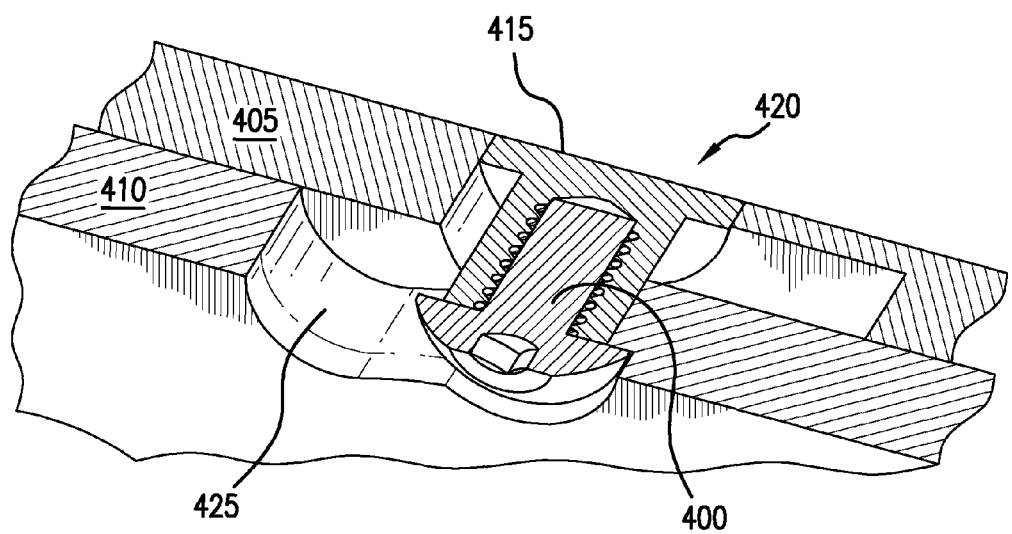
FIGS. 4a-4b depict a close-up cross-section of an exemplary security pin of a DAP.
Figure 4B:
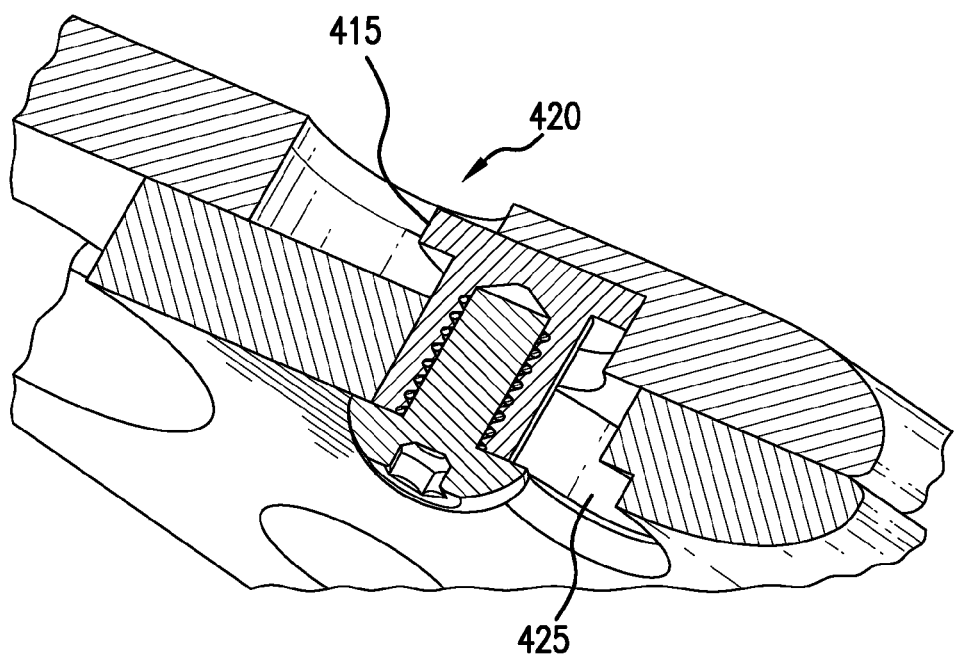

FIGS. 4a, 4b depict a close-up cross-section of an exemplary security pin of a DAP. In FIG. 4a, a security pin 400 is shown in the locked position. And the two plates 405, 410 are shown in the closed position. In the exemplary figure, a spring, which is not depicted, forces a head 415 of the securing pin into a complementary hole 420 of the first plate 405. When the head 415 of the securing pin 400 is in the first plate's complementary hole 420, the securing pin 400 is shown recessed into a machined grove 425 in the second plate 410. FIG. 4b depicts the security pin 400 in the depressed or unlocked position, and the two plates 405 410 in the open position. Note that in this depiction of an exemplary DAP, the head 415 of the securing pin 400 has been depressed and shown riding underneath the lip 430 of the first plate 405. As the securing pin is depressed, and the plates are in the open position, the pin rides above the second plate 410 and travels in the machined groove 425. When the plates return to the closed position, the spring which is not depicted will automatically force the head 410 of the securing pin 400 into the complementary hole 420 of the first plate 405. This automatic function of the spring locks the two plates into the closed position.

Figure 5A:
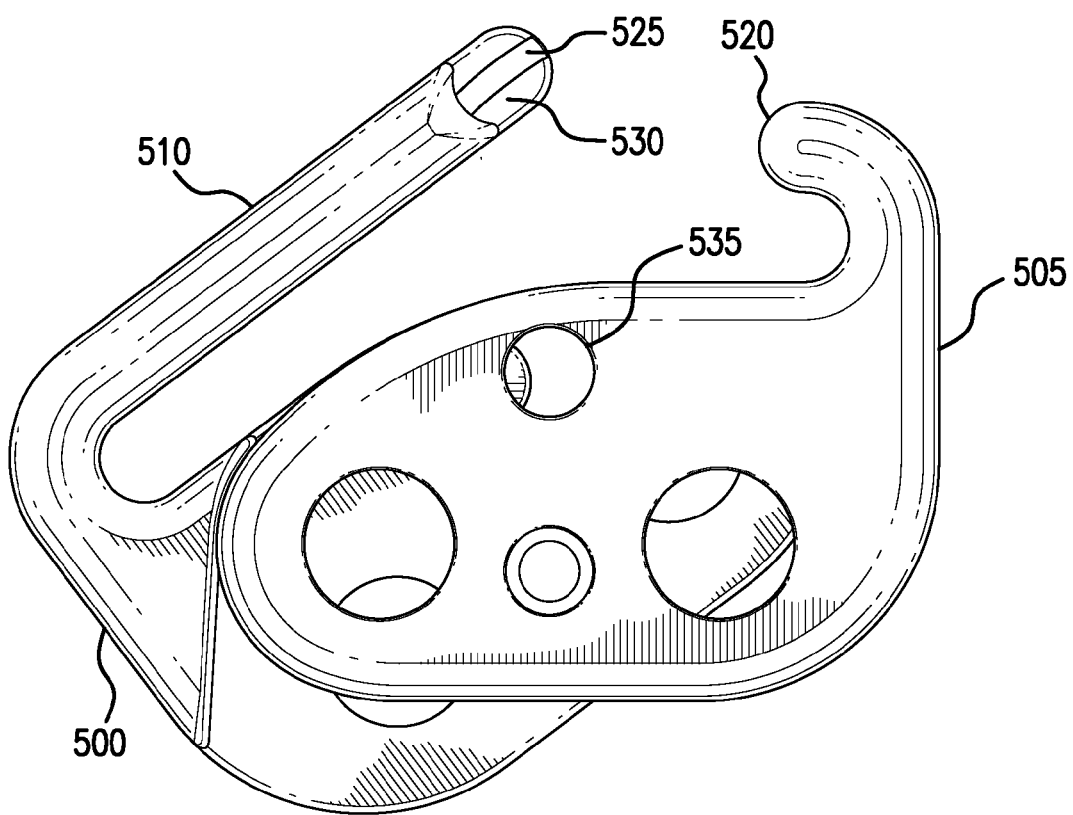
FIG. 5a-5b depicts an exemplary DAP with an asymmetric gate.
Figure 5B:
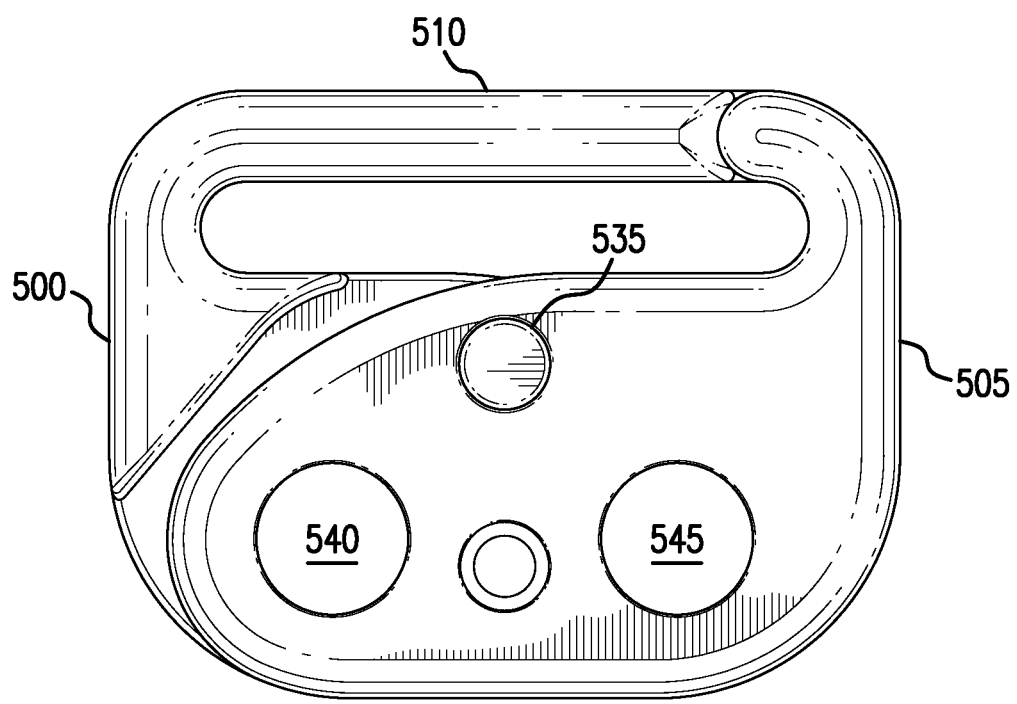

FIGS. 5a-5b depict an exemplary DAP with an asymmetric gate. In FIG. 5a, two plates 500 505 are shown in the open position. One plate 500 is shown in this example to have an arm 510. The second plate 510 is depicted with a mating surface 520. A groove 525 is shown on the mating surface 530 of the arm 510. A complementary groove (not depicted) in this figure may be machined on the mating surface 520 of the second plate 515. A securing pin 535 is shown in the depressed or open position in FIG. 5a. A pivot 530 is also shown in this exemplary embodiment of a DAP. FIG. 5b shows the asymmetric gate of this exemplary DAP in the closed position. The two device apertures 540 545 of this exemplary device are aligned in FIG. 5b.

Figure 6A:
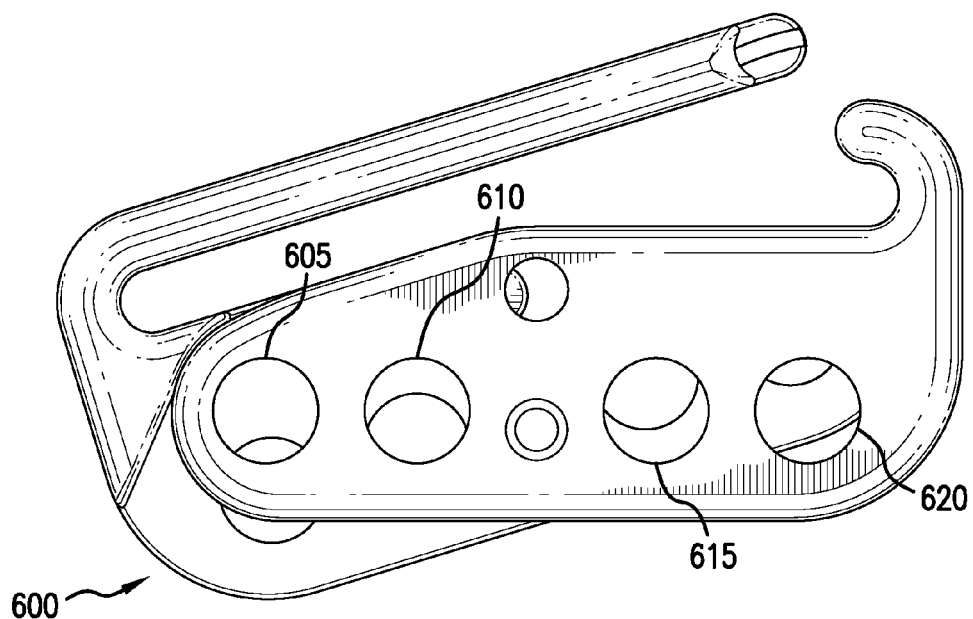
FIGS. 6a-6b depict an exemplary DAP with four device apertures.
Figure 6B:
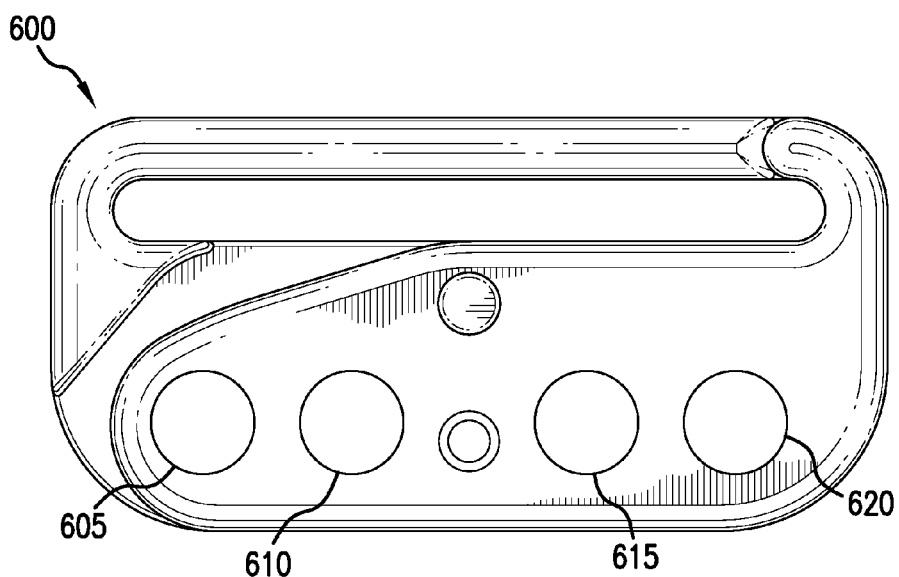

FIGS. 6a-6b depict an exemplary DAP with four device apertures. FIG. 6a depicts this exemplary DAP 600 in the open position. Four device apertures 605, 610, 615, 620 are shown to be not in registration. Because of the mis-registration of the two plate's device apertures, devices may not be able to be inserted into the device apertures in this open position. FIG. 6b shows the four aperture device 600 in the closed position. In this figure, the registration of the device apertures 605, 610, 615, 620 of the two plates are aligned. Four different devices can be attached to this exemplary DAP when the device is in the closed position.

Although various embodiments have been described with reference to the Figures, other embodiments are possible. For example, DAP's may be fabricated with three or more device apertures. In various embodiments the DAP may have other securing mechanisms. For example, a slide pin may be used to lock the two plates in a closed position. In one embodiment, for example, a screw may be used as a securing device. Any self-resetting mechanism may also be used as a securing device. For example, the slide pin may be spring-loaded permitting the automatic locking of the DAP when rotated to the closed position. A spring-loaded rotating mechanism can likewise be used as a securing device.

In an exemplary embodiment, the DAP may be coated with a rubber or vinyl coating. In accordance with another embodiment, the DAP may be manufactured with two webbing apertures. This may permit the DAP to simultaneously capture two portions of a webbing.

In accordance with another embodiment, the pin will travel in a groove. In other embodiments, rotational grooves may be manufactured in the mating surfaces of the arms. Still other embodiments may have rotational grooves on the mating surfaces of the two plates. Some embodiments will have the rotation limited by use of the extent of grooves. Other embodiments may limit rotation by other rotation limiting obstructions, such a channels or surface projections.

In some implementations, for example, the DAP may be designed to conform to the back of a human body permitting more comfort. In other implementations, the DAP may widely separate the device apertures which may thereby better prevent binding and twisting. In some exemplary embodiments, the device mating surfaces of the gating arms may have an additional locking mechanism which may provide additional security.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A fall-protection safety apparatus for connecting a webbed safety harness to other devices, the apparatus comprising:
    two pivotably-coupled complementary plates that slidably contact each other and rotate about a shared pivot between an open position and a closed position, each plate comprising:
        a mating surface, upon which the slidable rotation occurs;
        a plurality of device apertures, which are disposed so as to align with the corresponding plurality of device apertures of the complementary plate in the closed position, and when a device is inserted through one plate's device aperture and its aligned complementary plate's device aperture the complementary plates become locked in the closed position by the device; and
        an arm with a distal end, which meets a distal end of the complementary plate's arm in the closed position so as to form an attachment aperture to secure the webbing, and which allows a webbing to be introduced in the open position; and
    a spring-loaded securing pin, which automatically locks the complementary plates in the closed position when the plates are rotated into that closed position,
    wherein in both the open and closed positions, at least one end of each of the plates remains in slidable contact with the other plate at a location other than the pivot point.

2. The fall-protection safety apparatus of claim 1, further comprising:
    a mating surface on the distal end of one of the plate's complementary arms, the mating surface having a positive feature; and
    a mating surface on the distal end of the other plate's complementary arm that has a groove feature, which, when the plates are in the closed position, provides a channel for the first plate's positive feature to slidably contact.

3. The fall-protection safety apparatus of claim 1, further comprising:
    a raised positive feature relative to the slidable surface of one plate; and
    a portion of the other plate, which contacts the raised positive feature when the plates are rotated to the full open position, thereby providing a rotational stop.

4. The fall-protection safety apparatus of claim 1, wherein the plurality of device apertures comprises two device apertures.

5. The fall-protection safety apparatus of claim 1, wherein the plurality of device apertures comprises at least three device apertures.

6. The fall-protection safety apparatus of claim 1, further comprising a webbing, the webbing connected to the apparatus by passing through the webbing aperture, the webbing capable of being secured to another object.

7. The fall-protection safety apparatus of claim 1, further comprising a safety harness that includes the webbing.

8. A fall-protection safety apparatus for connecting a webbed safety harness to other devices, the apparatus comprising:
    a first plate having a mating surface;
    a second plate, the second plate engaging the mating surface of the first plate along the second plate's mating surface;
    a pivot connecting the first and second plates at a pivot location, the plates rotating about the pivot location, the plates being slidable between a closed position and an open position, wherein in both the open and closed positions, at least one end of each of the plates remains in slidable contact with the other plate at a location other than the pivot point;
    a plurality of device apertures in each plate, the device apertures of the second plate being registered with those of the first plate when the apparatus is in the closed position;
    a gate, the gate comprising:
        an arm on one of the plates;
        a gate mating location on the other plate, the gate being open when the apparatus is in the open position, permitting the insertion of a webbing, the gate being closed when the apparatus is in the closed position, providing secure capture of the webbing; and
    a control member locking the plate registration when the apparatus is in the closed position, the control member allowing the first and second plates to slide when the apparatus is in the open position.

9. The fall-protection safety apparatus of claim 8, the control member comprising:
    a spring loaded pin, the pin having a depressed position and a locking position, the depressed position enabling the first plate to slide along the slidable surface of the second plate, and the locking position locking the plates when the apparatus is in the closed position; and
    a spring, the spring forcing the pin into the locking position when the apparatus is in the closed position.

10. The fall-protection safety apparatus of claim 8, wherein the insertion of a connecting device into one of the device apertures when the apparatus is in the closed position locks the plates in the closed position of the apparatus.

11. The fall-protection safety apparatus of claim 8, wherein the plurality of the device apertures comprises two device apertures.

12. The fall-protection safety apparatus of claim 8, wherein the plurality of the device apertures comprises at least three device apertures.

13. The fall-protection safety apparatus of claim 8, further comprising:
    a mating surface on the distal end of the gate's arm, the mating surface having a positive or groove feature; and
    a mating surface on the gate's mating location, the mating surface having a complementary groove or positive feature respectively, which, when the plates are in the closed position, provides a complementary feature for the first plate's feature to slidably contact.

14. The fall-protection safety apparatus of claim 8, further comprising:
    a raised positive feature relative to the slidable surface of the first plate; and
    a portion of the second plate, which contacts the raised positive feature when the plates are rotated to the full open position, thereby providing a rotational stop.

15. The fall-protection safety apparatus of claim 8, further comprising a webbing, the webbing connected to the apparatus by passing through the webbing aperture, the webbing capable of being secured to another object.

16. The fall-protection safety apparatus of claim 8, further comprising a safety harness that includes the webbing.

\* \* \* \* \*